United States Patent [19]

Jow et al.

[11] Patent Number: 4,804,594

[45] Date of Patent: * Feb. 14, 1989

[54] PREDOPED CONDUCTIVE POLYMERS AS BATTERY ELECTRODE MATERIALS

[75] Inventors: Taiguang R. Jow, Morris; Lawrence W. Shacklette, Essex, both of N.J.

[73] Assignee: Allied-Signal Inc., Morris Township, Morris County, N.J.

[*] Notice: The portion of the term of this patent subsequent to May 26, 2004 has been disclaimed.

[21] Appl. No.: 107,312

[22] Filed: Oct. 13, 1987

[51] Int. Cl.[4] ...................... H01M 10/40; H01M 4/60
[52] U.S. Cl. ..................................... 429/194; 429/213
[58] Field of Search ........................ 429/213, 194, 197

[56] References Cited

U.S. PATENT DOCUMENTS

| | | | |
|---|---|---|---|
| 4,321,114 | 3/1982 | MacDiarmid et al. | 429/213 |
| 4,668,596 | 5/1987 | Shacklette et al. | 429/213 |
| 4,695,521 | 9/1987 | Shacklette et al. | 429/213 |

OTHER PUBLICATIONS

T. R. Jow et al. "A Rechargeable Cell Based on a Conductive Polymer/Metal Alloy ... " Allied-Signal Inc.-/Corp Tech.

T. R. Jow et al. "The Role of Conductive Polymers . . . " Jrnl. of Electrochem. Soc., vol. 134/No. 7/Jul. 1987, pp. 1730-1733.

Proceeding of the Synposium on "Lithium Batteries" Edited by A. N. Dey/vol. 87-1, The Electrochem Soc. 1987/pp. 314-324.

Primary Examiner—Donald L. Walton
Attorney, Agent, or Firm—Richard C. Stewart; Gerhard H. Fuchs

[57] ABSTRACT

This invention relates to novel electrodes for use in batteries, and to batteries containing the electrodes, which electrodes comprise a conjugated backbone polymer which has been predoped with an anionic or cationic dopant prior to fabrication into a battery.

19 Claims, No Drawings

PREDOPED CONDUCTIVE POLYMERS AS BATTERY ELECTRODE MATERIALS

BACKGROUND OF THE INVENTION (1) Field of the Invention

This invention relates to polymeric electrodes. More particularly, this invention relates to electrodes for non-aqueous secondary batteries composed of predoped conjugated backbone polymers.

(2) Prior Art

Conjugated backbone polymers, e.g., polyacetylene, polyphenylene, polyacenes, polythiophene, poly(phenylene vinylene), polyazulene, poly(phenylene sulfide), poly(phenylene oxide), polythianthrene, poly(phenylquinoline), polyaniline, poly(thienylene vinylene), poly(furylene vinylene), and polypyrrole, and their derivates have been suggested for use in a variety of applications based upon their characteristic of becoming conductive when oxidized or reduced either chemically or electrochemically. The secondary battery application described by, e.g., MacDiarmid et al. in U.S. Pat. No. 4,321,114 (1981); *J. de Physique,* Colloque C3, Vol. 44 (1983), articles beginning on page 579, page 615 and page 537; and K. Kaneto et al., *Japanese J. of Applied Physics,* Vol. 22, pp. L567-L568 (September 1983) and pp. L412-L414 (July 1983), employs one or more electrodes having conjugated backbone polymers as the electroactive material. Such electrodes can, for example, be reversibly complexed with alkali metal or tetraalkylammonium cations during battery cycling, most commonly with insertion of cations into a polymer anode (the negative battery electrode) occurring during charging. The more such cations are inserted, the more conductive the electrode becomes and the more cathodic the potential of the anode becomes.

U.S. Pat. No. 4,002,492 discloses electrochemical cells having an anode consisting essentially of lithium aluminum alloys that contain lithium in amounts between about 63% and 92% and the balance essentially aluminum. Anodes composed of lithium and aluminum are also disclosed in Rao, et al., *J. Electrochem. Soc.* 124, 1490 (1977), and Besenhard, *J. Electroanal. Chem.,* 94, 77 (1978).

European Patent No. 0070107 Al; Murphy et al., *J. Electrochem. Soc.,* 126, 349 (1979) and Murphy et al., *Mat. Res. Bull.,* 13, 1395 (1978) disclose batteries based on lithium intercalation in layered dichalcogenides.

Composite structures of a conjugated backbone polymer and a non-electroactive material have been described in U.S. Pat. No. 4,294,304 and in the above *J. de Physique* issue, articles beginning on page 137 and on page 151. Representative other components that have been blended with polyacetylene or onto which polyacetylene or polypyrrole have been deposited include polyethylene, polystyrene, graphite, carbon black, NESA glass and silicon. In selected instances, such composite structures have been suggested for use in batteries, see Showa Denko K. K., European Published Patent Application 76,119 (1982).

U.S. Pat. No. 4,668,596 is directed an anode and to batteries containing the anode. The anode comprises a mixture of a conjugated backbone polymer and another electroactive material selected from the group consisting of metals which alloy with alkali metals such as aluminum and lead and alkali metal cation insertions materials such as transition metal chalcogenides.

Conventional batteries have heretofore been constructed in which a conjugated backbone polymer is one of the electroactive materials, such batteries suffer from a number of disadvantages. For example, impurities, including oligomers, often exist in the polymer. These form species which are soluble in the electrolyte solvent and which may adversely affect battery performance. These adverse effects include capacity loss and cell self-discharge. Moreover, the large volume changes of the polymer before and after doping may seriously affect electrode shape and uniformity and may induce cell shorting during cycling.

SUMMARY OF THE INVENTION

The present invention provides an improved battery of the type which comprises a cathode means, an anode means and an electrolyte, at least one of said anode means and said cathode means including as an electroactive material a conjugated backbone polymer which is characterized by having conjugated unsaturation along a main backbone thereof, said polymer being electrochemically oxidizable to a p-type doped material by doping with an anionic dopant species or reducible to a n-type doped material by doping with a cationic dopant species, said eletrolyte comprising an organic solvent and a compound which is ionizable into one or more anionic or cationic dopant species, said improvement comprising a polymer which has been pre-doped with one or more anionic or cationic dopant species to said oxidized or reduced states.

Several advantages flow from this invention. For example, use of the pre-doped polymer in the cathode and/or anode allows extraction of soluble impurities and oligomers from the polymer and results in an improvement in the cycle life and self-discharge rate of the cell. Moreover, an electrode constructed with pre-doped polymer has a smaller volume change between initial fabrication and cell use such that the electrode integrity is maintained during cycling and cell shorting is prevented. Furthermore, the use of the pre-doped polymer maximizes the capacity of the electrode.

DESCRIPTION OF THE PREFERRED EMBODIMENTS

As an essential component, the battery of this invention includes a cathode means and anode means, at least one of which comprises one or more conjugated backbone polymers or copolymers, or blends of one or more conjugated polymers or copolymers with one or more conjugated or non-conjugated backbone polymers or copolymers (hereinafter referred to collectively as "conjugated backbone polymer"), which polymers, copolymers or blends have been predoped with a suitable anionic or cationic dopant whichever is applicable.

Useful polymers for use in the anode of this invention may be any of the variety of conjugated backbone polymers known to those of skill in the art for use as negative electrodes in batteries. Such polymers are preferably conductive in their reduced form and capable of reversibly inserting cations. Useful polymers are also insoluble or substantially insoluble in the electrolyte (i.e., preferably a solubility equal to or less than about 500 ppm). Useful conjugated backbone polymers may be conjugated backbone homopolymers or copolymers, or blends of one or more conjugated backbone homopolymers or copolymers with one or more conjugated backbone or non-conjugated backbone homopolymers or copolymers. Useful conjugated backbone polymers can vary widely and include polyacetylene, polyphenylene, (if in the para form), poly(phenylene vinylene), poly(thienylene vinylene), poly(furylene vinylene) and substituted derivates and the like, and blends thereof with other polymers having either conjugated or non-conjugated backbones, such as polyethylene.

Other conjugated backbone polymers claimed by others as useful in batteries may also be used in the present invention either in the anode or the cathode. Such polymers include polythiophene, polyazulene, polypyrrole, polyaniline, polyphenylene sulfide, poly(thienylene vinylene), poly(furylene vinylene) polyphenylene oxide, polyacenes, poly(phenylquinoline), polyacediyl, polynaphthalene, and substituted derivatives thereof. All of these polymers have conjugated unsaturation along their main backbone chain. Such conjugated polymers may be employed in the present invention in any suitable form, such as, for example, in the form of films, compacted powders, or powders dispersed in a suitable carrier matrix, e.g., another organic polymeric material. Amongst these illustrative conjugated backbone polymers, polyacetylene, polypyrrole, polyaniline, poly(phenylene vinylene), poly(thienylene vinylene), and poly(p-phenylene) are preferred, and polyacetylene and poly(p-phenylene), polypyrrole, and polyaniline, are particularly preferred. Most preferred for use in the practice of this invention is polyacetylene and poly(p-phenylene).

Useful conjugated backbone polymers are known compounds which can be prepared by conventional means. For example, high quality polyacetylene, a preferred conjugated backbone polymer, can be conveniently prepared by the procedures described in a series of papers by Shirakawa, et al., Polymer Journal, Vol. 2, No. 2, pp. 231-244 (1971); Polymer Journal, Vol. 4, No. 4. pp. 460-462 (1973); Journal of Polymer Science Part A-1, Polymer Chemistry Edition, Vol. 12, pp. 11-20 (1974), and Journal of Polymer Science Part A-1, Polymer Chemistry Edition Vol. 13, pp. 1943-1950 (1975), all of which are incorporated herein by reference. Moreover, forms of high quality poly(p-phenylene), another preferred conjugated backbone polymer, can be prepared by the method of Kovacic described in detail in J. Am. Chem. Soc. 85, 454-458 (1963), incorporated herein by reference. Furthermore, poly(phenylene vinylene), another preferred conjugated backbone polymer, can be prepared by the procedure described in U.S. Pat. No. 3,404,132 of R. A. Wessling et al.

Still another preferred conjugated backbone polymer, polyaniline, can be prepared by the procedure described in J-C. Chiang et al. Synth. Metals 13, 193-205 (1986), and polypyrrole yet another preferred conjugated backbone polymer can be prepared by the procedure described in G. P. Gardini, Adv. Heterocycl. Chem., 15, 67 (1973).

The polymers useful in the practice of this invention are "pre-doped" prior to fabrication in the battery. As used herein "pre-doped" means that the cationic or anionic dopant which is also present as an ionic specie in the electrolyte is already doped in the polymer or polymers before fabricating the electrochemical cell, and preferable before fabricating the electrode or electrodes which contain the conjugated polymer. The degree of predoping may vary widely. In general, the level of predoping is at least about 2 mole % based on the total number of unsaturated bonds in the conjugated backbone. In the preferred embodiments of the invention, the level of predoping is from about 5 to about 50 mole % based on the total number of unsaturated bonds in the conjugated backbone, and in the particularly preferred embodiments is from about 10 to about 50 mole % on the aforementioned basis.

Any known doping procedure can be employed to form the pre-doped polymer. For example, the polymer can be predoped electrochemically using the procedure of U.S. Pat Nos. 4,321,114 and 4,472,987. The polymer can also be predoped chemically, using procedures such as those described in U.S. Pat. Nos. 4,222,903 and 4,204,216. In the preferred embodiments of the invention, the polymer is predoped employing the predoping process of this invention. In this process, the polymer is contacted with a suitable doping agent and an anionic p-type dopant or a cationic n-type dopant in a suitable solvent to anionically or cationically dope polymers. This process makes the doping process simple and clean. The impurities, including the doped soluble species, can be washed and filtered out easily. Also, the process does not introduce any additional species or byproducts which would have to be subsequently removed. This process is also much more efficient than electrochemical doping processes. In the latter process, polymers must be fabricated into an electrode before doping. However, once the electrode is formed, extraction of soluble impurities is difficult.

In cationic doping, the dopant may vary widely and may include such dopants as elemental alkali metals, alkalimetal alloys, or amalgams. In the preferred embodiments of the invention, the dopant is elemental alkali metal. In these preferred embodiments, the polymer can be predoped merely by contacting the polymer and the elemental metal in an appropriate solvent. For cationic doping, the preferred solvents are ethers. Most preferred are dimethoxyethane, tetrahydrofuran, 2-methyltetrahydrofuran.

For anionic (p-type) doping, there are a large number of potential doping agents. The doping agent, however, should most preferably be chosen so that it clearly produces an anionic counterion to the charged polymer which is the same as that which will be contained in the electrolyte to be used in the construction of the electrochemical cell. Thus, if the anion of the electrolyte of the cell may be denoted, $A^-$, where $A^-$ is for example $Cl^-$, $Br^-$, $I^-$, $I_3^-ClO_4^-$, $BF_4^-$, $PF_6^-$, $AsF_6^-$, $SbF_6^-$, $CF_3SO_3^-$, $AlCl_4^-$, $FeCl_4^-$, $SiF_5^-$, $HSO_4^-$, $CF_3CO_2^-$, $AsF_4^-$, $BCl_4^-$, $NO_3^-$, $SCN^-$, $SO_4^{-2}$, $C_6H_5CO_2^-$, $PCH_3C_6H_4SO_3^-$, $SiF_6^{-2}$, and the like, then the doping agent is preferably an oxidizing salt containing this anion. Preferred for use in the practice of this invention for anionic dopants are the oxonium, sulfonium, nitronium, nitrosonium, and phosphonium salts of $A^-$. Nitronium and nitrosonium salts are most preferred. Another preferred anionic doping medium is a solution of a separate oxidizing agent and a salt or acid containing $A^-$, as for example, iodine plus potassium iodide in water to accomplish doping with $I_3^-$ counterions. Suitable oxidizing agents include oxygen, peroxides, chlorine, iodine, and the like, as well as organic oxidants such as chloranil, DDQ, and the like. Suitable salts are those which contain $A^-$ with oxidatively stable cations such as alkali metal or alkylammonium cations. Suitable solvents are those which are inert to the oxidizing species employed. Most preferred are low viscosity, low boiling point solvents having a high dielectic constant, such as acetonitrile, benzonitrile, and nitromethane. Also useful are dimethoxyethane, anisole, toluene, propylene carbonate, water, sulfolane, methylene chloride, nitrobenzene, nitroethane, sulfur dioxide, and the like.

In the preferred embodiments of the invention, the anode means comprises a mixture of one or more conjugated backbone polymers; and one or more other potential electoactive materials selected from the group consisting of metals which are capable of alloying with alkali metals and materials capable of inserting alkali-metal cations. Illustrative of useful conjugated backbone polymers are those described above for use in the fabrication of anodes. Useful alkali metal alloying metals can vary widely. Illustrative of such useful metals are aluminium, lead, magnesium, tin, bismuth, cadmium, gallium, indium, antimony, silicon, and alloys of these or other metals, such as Al-Si, PbSn, Al-Mg, Al-Si-Sn, or Wood's Metal (Bi-Pb-Sn-Cd) and the like. The preferred alkali metal alloying metals for use in the practice of this inventon are aluminum, lead, tin and alloys thereof. In the particularly preferred embodiments of the invention, aluminum and lead are used for lithium alloying, and lead, tin and tin/lead alloys are used for sodium alloying.

Alkali-metal cation inserting materials can also vary widely. As used herein, "alkali metal cation inserting materials" are materials into which alkali metal cations can be inserted, as for example, into channels in the material, between layers of the material and the like. Such materials are known to those of skill in the art. Such materials include but are not limited to graphite, transition-metal chalcogenides, and other conjugated backbone polymers which are capable of being reduced, i.e., donor doped. Preferred cation inserting materials are transition-metal chalcogenides such as $TiS_2$, $MoO_2$, $WO_2$, $VSe_2$, $FeCuS_2$, and $VS_2$.

The amounts of the various components for use in the anode of this preferred embodiment of the invention can vary widely, depending on a number of factors, as for example, the balance chosen between electrochemical capacity, and the desired mechanical properties of the anode, electrode, and the like. In general, the amount of the conjugated backbone polymer component in the anode should be sufficient to impart mechanical stability and good cycle life to the electrode. In the preferred embodiments of the invention, the amount of the conjugated backbone polymer component may vary from about 5 to about 75 percent by weight based on the total weight of polymer and other electroactive material in the anode, and in the particularly preferred embodiments up from about 20 to about 50% by weight on the aforementioned basis.

Similarly, the amount of the other electroactive material (e.g., alkali metal alloying material and/or inserting material) can also vary widely depending on a number of factors, as for example, the balance chosen between electrochemical capacity and the desired mechanical properties of the electrode and the like. Usually the amount of such material varies from about 25 to about 95 weight percent based on the total weight of conjugated backbone polymer and other electroactive material. In the preferred embodiments of the invention, the amount of the other material may vary from about 50 to about 80 weight percent on the aforemention basis.

The particular conjugated backbone polymer and alloying metal and/or cation inserting material chosen for use in this preferred anode may vary widely. However, in the preferred embodiments of the invention the polymer and other electroactive material are selected such that the range of electroactivity of the polymer encompasses or closely matches that of the other component.

The following table lists exemplary combinations of conjugated backbone polymer and alkali metal alloying metal or alkali metal cation inserting material which can be used in the improved anode of this invention.

| POLYMER | POLYMER ELECTRO-ACTIVE RANGE* | ELECTROACTIVE MATERIAL** | ELECTRO-ACTIVE RANGE* |
|---|---|---|---|
| PA, polyacetylene | 0.1–1.8 V | $Li_xAl$ | 0.2–0.5 V |
| PPP, polyphenylene | 0.1–1.1 V | $Li_yI$ | 0.2–0.6 V |
| PPP, polyphenylene | 0.1–1.1 V | $Na_yPb$ | 0.3–0.9 V |
| PPP, polyphenylene | 0.1–1.1 V | $Li_xWO_2$ | 0.3–1.2 V |
| PPQ, poly(phenyl-quinoline) | 1.5 V | $Li_xMoO_2$ | 0.8–1.8 V |
| PPV, poly(phenylene vinylene) | 0.1–1.4 V | $Li_{1+x}TiS_2$ | 0.5–0.6 V |
| PAZ, polyazulene | *** | $Li_{1+x}VSe_2$ | 1.0–1.3 V |
| PETV, poly(ethoxy-thienylene vinylene) | 1.25–1.65 | $Li_xFeCuS_2$ | 1.5 V |

*Relative to $Li/Li^+$ reference.
**where $0 < x < 1, 0 < y < 3.75$

The table shows that a combination of polyacetylene and the alloying metal, aluminum (Al), and combinations of poly(phenylene) and the lithium alloying metal, lead (Pb) or poly(phenylene) and the inserting material $WO_2$, are combinations of polymers and alloying metal or inserting materials which would be expected to provide good results.

The method of fabricating the anode for use in the preferred embodiments of this invention is not critical and can be varied widely. Any method known to those of skill in the art for fabricating composites of polymer and a metal or alkali metal ion inserting material can be used. In the preferred embodiments, the anode is composed of an intimate mixture of compressed powders. The anode is fabricated by (1) derivatizing the surface of a finely divided alkali metal alloying metal or alkali metal cation inserting material with active polymer catalyst; (2) dispersing the derivatized metal or material having a desired small particle size in a suspension or solution of a monomer and/or a pre-polymer of the desired conjugated backbone polymer and polymerizing the monomer and/or pre-polymer in the presence of the dispersed metal or material and; (3) fabricating a cohesive solid by recovering the polymerization product and derivatized metal or material from the polymerization mixture from said suspension or solution and compressing same into a powdered composite, or by casting a film of suspension or gel-like composition comprising the polymerization product, and metal or material.

The organic solvents which may be included in the electrolyte of the batteries of the present invention may vary widely and can be organic solvents normally used in batteries. Preferably, these solvents should be electrochemically inert to oxidation and reduction during use while simultaneously being capable of dissolving the desired alkali metal salt and providing ionic conductivity equal to or in excess of $10^{-4}$ S/cm. Examples of such useful organic solvents include propylene carbonate, ethylene carbonate, sulfolane, methyl sulfolane, dimethyl sulfolane, 3-methyl-2oxazolidone, alkane sultones, e.g., propane sultone, butane sultone (the use of sultones as electrolyte compositions is the subject of a related, commonly-assigned U.S. patent application Serial No. 556,717, now U.S. Pat. No. 4,528,254 and the use of sultones for coatings on polymer anodes is the subject of a related, commonly-assigned U.S. Pat. No. 4,472,489), dimethyl sulfoxide (DMSO), dimethyl sulfide, tetrahydrofuran (THF), 2-methyltetrahydrofuran (2-MTHF), dioxane, dioxolane, 1,2-dimethoxyethane (DME), dimethoxymethane, diglymes, glymes, methyltetrahydrofurfuryl ether, anisole, nitriles, (e.g., proprionitrile, butyronitrile, acetonitrile, benzonitrile), dichloromethane, tetraethylsulfamide, aromatic hydrocarbons, e.g., toluene, benzene, organo phosphorus compounds, e.g., hexamethylene phosphoramide, and trimethyl phosphate. Mixtures of such available organic solvents may also be used, such as mixtures of sulfolane and acetonitrile, or mixtures of propylene carbonate and dimethoxyethane. Some inorganic solvents such as sulfur dioxide, thionyl chloride, and the like may also be useful as solvents in the electrolyte.

The organic or inorganic solvents chosen for use in any particular situation will, of course, depend upon many factors such as the precise electrolyte composition used and the voltage range desired, as well as the choice of cathode and other components of the battery used. A particularly important consideration in choosing a solvent is whether the conjugated backbone polymer employed is subject to attack by the solvent. In the preferred embodiments of the invention when uncoated anodes are employed, ether-type solvents such as tetrahydrofuran, dimethoxyethane, diglyme, 2-methyltetrahydrofuran and mixtures thereof are employed because these solvents are generally not reactive with conjugated backbone polymers, when in their neutral or reduced forms. Essentially, any of the above-listed solvents can be used with anodes coated with solvent-resistant coatings; however, preferred for use with coated anodes are propylene carbonate, ethylene carbonate, sulfolane, 3-methylsulfolane and mixtures of any of the above-listed solvents, which mixtures may also include glymes, particularly dimethoxyethane.

The electrolyte includes a compound which is ionizable during the operation of the cell into ionic dopant species. Upon operation of the cell, the predoped cojugated backbone polymers, if used as the positive electrode, becomes doped with an anionic dopant species to a p-type material; or if used as the negative electrode predoped polymer becomes doped with a cationic dopant species to a n-type material. A wide variety of ionizable compounds may be suitably employed, either individually or in combination. Illustrative of such materials are the salts of alkali metals and alkali earth metal salts with anions, such as for example halides, $PF_6^-$, $ClO_4^-$, $BF_4^-$, $SO_3CF_3^-$, $BCl_4^-$, $AlCl_4^-$, $FeCl_4^-$, $NO_3^-$, $POF_4^-$, $SCN^-$, $AsF_6^-$, $SbF_6^-$, $CF_3CO_2^-$, $C_6H_5CO_2^-$, $HSO_4^-$, p—$CH_3C_6H_4SO_3^-$, $SiF_6^{-2}$, and the like.

In the preferred embodiments of this invention where the anode is a composite comprised of one or more conjugated backbone polymers and one or more electroactive materials selected from the group consisting of metals which alloy with alkali metals and alkali metal cation inserting materials, Salts for use in the electrolyte of the battery of this invention are of the formula:

MA wherein:
M is an alkali metal; and
A is a species which is anionic in the electrolyte and stable under operational conditions.

Preferred alkali metals are lithium, sodium and potassium, and the particularly preferred alkali metals are lithium and sodium. Suitable anionic species include $I^-$, $Br^-$, $Cl^-$, $ClO_4^-$, $PF_6^-$, $AsF_6^-$, $SO_3CF_3^-$, $BF_4^-$, $BCl_4^-$, $AlCl_4^-$, alkylborates, such as $B(CH_3)_4^-$, arylborates, such as $B(C_6H_5)_4^-$, (the use of such borate salts with conjugated polymers being the subject of commonly assigned U.S. patent application Ser. No. 556,721, incorporated herein by reference), $POF_4^-$, $CN^-$, $SCN^-$, $OCN^-$, $CF_3CO_2^-$(trifluoroacerate ), $C_6H_5CO_2^-$(benzoate), $CH_3C_6H_4SO_3^-$(tosylate), $HSO_4^-$ and the like. Preferred anions are alkylborates, arylborates, or alkylarylborates, $PF_6^-$, $ClO_4^-$, halide ions, $SO_3CF_3^-$, and $BF_4^-$, and particularly preferred anions are alkylborates, arylborates, alkylarylborates and $PF_6^-$, with $PF_6^-$ being the anionic specie of choice.

Molten salts may also be employed as the electrolyte of the battery of the invention. The use of conjugated polymers as anodes in room-temperature molten salt batteries is described in the commonly-assigned U.S. Pat. No. 4,463,071, which is incorporated herein by reference. Room-temperature molten salts suitable for use in batteries of this invention include alkali metal halide-trialkylimidazolium chloroaluminate, alkali metal halide-dialkylimidazolium chloroaluminate, and alkali metal halide alkyl pyridinium chloroaluminate. Since in many cases the polymers, alloys, and other ion inserting materials of this invention are stable at elevated temperature, intermediate temperature molten salts (M.P.<200° C.) such as $NaAlCl_4$ or $KAlCl_4$, are also suitable for use.

Cathodes for use in the practice of this invention are not critical and can be varied widely. Suitable cathodes include a material selected from the group consisting of graphite, intercalation compounds of graphite, high surface area carbons (>200 m$^2$/g), transition-metal chalcogenides, and conjugated backbone polymers which are capable of being oxidized (acceptor-doped). Transition-metal chalcogenides and conjugated backbone polymers are preferred cathode materials.

The transition-metal chalcogenides, suitable as cathode materials useful in this invention, can contain inserted alkali metals and include the transition-metal dichalcogenides such as $TiS_2$ and, among others, those listed on page 392 of "Lithium Batteries" edited by J. P. Gabano (Academic Press, 1983) and in K. M. Abraham, Solid State Ionics, vol. 7, pp. 199-212 (1982) (both incorporated herein by reference). These include (with approximate open circuit potentials measured in various organic electrolytes when fully charged or devoid of inserted cations):

| | |
|---|---|
| $Na_xTiS_2$ | 2.1 V versus $Na/Na^+$ |
| $Na_xNbS_2Cl_2$ | 2.2 V versus $Na/Na^+$ |
| $Li_xMoS_2$ | 2.3 V versus $Li/LI^+$ |
| $Li_xFe_{0.25}V_{0.75}S_2$ | 2.3 V verus $Li/LI^+$ |
| $Li_xTiS_2$ | 2.5 V versus $Li/Li^+$ |
| $Li_xMoS_3$(amorphous) | 2.5 V versus $Li/Li^+$ |
| $Na_xCr_{0.5}S_2$ | |
| $Na_xWO_{3-y}$ | 2.6 V versus $Na/Na^+$ |
| $Na_xMoS_3$(amorphous) | 2.7 V versus $Na/Na^+$ |
| $Na_xTaS_2$ | 2.7 V versus $Na/Na^+$ |
| $K_xWO_{3-y}$ | |
| $Li_xMoO_3$ | 2.8 V versus $Li/Li^+$ |
| $Li_xV_6O_{13}$ | 2.9 versus $Li/Li^+$ |
| $Li_xCr_{0.5}V_{0.5}S_2$ | 2.9 V versus $Li/Li^+$ |
| $Li_xW_{0.2}V_{2.8}O_7$ | 3.0 V versus $Li/Li^+$ |
| $Li_xCr_3O_8$ | 3.6 V versus $Li/Li^+$ |
| $Na_xCoO_2$ | 3.7 V versus $Na/Na^+$ |
| $Li_xCoO_2$ | 4.7 V versus $Li/Li^+$ |

Suitable polymer cathodes include oxidized polyacetylene, poly(p-phenylene), polyacenes, poly(phenylene vinylene), polyazulene, polynaphthalene, poly(phenylene sulfide), poly(phenylene oxide), polyphenothiazine, polyaniline, polypyrrole, polythiophene, polythianthrene and substituted versions of the above. Such polymers may be coated by reaction, when oxidized, with pyrroles, thiophenes, azulenes, oxiranes, anilines or furans, as described in commonly-assigned U.S. Pat. No. 4,472,987, the disclosure of which is incorporated herein by reference.

The secondary battery of this invention can be charged and discharged in accordance with the procedure described in U.S. Pat. No. 4,321,114. Such procedures are well known to those of skill in the art and will not be described herein in any great detail.

The following specific examples are presented to more particularly illustrate the invention and are not to be construed as limitations therein.

EXAMPLE I

Sodium doped poly(p-phenylene) ("PPP") was prepared by soaking the PPP powder in dimethoexyethane (DME) solvent and stirring with a piece of sodium metal. In a few days, the light brownish PPP powder became blue and then dark blue. A very light blue purplish color solution was filtered out. After four repeated washing and filtering, the powder was dried in vacuum and ready for use. The conductivity of the pellets pressed from the above powder was 26.5 S/cm. The potential of this pellet measured against sodium in $NaPF_6$ in DME electrolyte was 0.250V which corresponded to 30% Na doping per phenylene unit.

EXAMPLE II

Lithium doped PPP was prepared by soaking the PPP powder in DME and stirring with a piece of Li. In a few days to week, the PPP powder became dark blue. After several washing and filtering until the filtered solution was clear, the powder was then dried under vacuum and ready for use. The conductivity of the pellet made from the above powder was 5.5 S/cm. The potential of the pellet measured against Li in $LiPF_6$/2-methyl tetrahydrofuran was 0.320V which corresponded to 37% Li doping per phenylene unit.

EXAMPLE III

Lithium doped polyacetylene ("PA") was prepared by soaking the PA powder in DME and stirring with a piece of Li. In a few days, the powder was washed and filtered several times to eliminate the brownish color. The powder was then dried under vacuum before use. The conductivity of the pellet made from the above powder was 17 S/cm. The potential of the pellet measured against Li in 1M $LiPF_6$/2-Methyltetrahydrofuran was 0.6V which corresponded to 9% of Li doping per acetylene unit.

EXAMPLE IV

A Composite negative electrode was made of 19.2 w/o sodium predoped PPP from Example 1 and 77.2 weight percent of $Na_{3.75}Pb$ with the remaining balance as the binder. This negative electrode was cycled against a sodium cobalt dioxide ($Na._{67}CoO_2$) positive electrode. There was no discoloration observed around the negative electrode or in the cell. The cell didn't show any appreciable capacity loss (capacity loss was about 3%) within the first 50 cycles.

COMPARATIVE EXAMPLE I

A composite negative electrode was made of 17 weight percent PPP (which has been heat-treated under vacuum at 320° C. overnight) and 76 weight percent sodium lead alloy ($Na_{3.75}Pb$) with the remaining balance as the binder. This electrode was cycled against a sodium cobalt dioxide ($Na._{67}CoO_2$) positive electrode. At the first few cycles, a very light purple color was shown around the negative electrode. This color disappeared in the subsequent cycles. The positive electrode lost 50% of its capacity after 50 charge/discharge cycles.

What is claimed is:

1. An improved battery of the type which comprises: an anode comprising one or more conjugated backbone polymers and one or more electroactive materials selected from the group consisting of metals which alloy with alkali metals and alkali metal cation inserting materias; an electrolyte comprising an organic solvent and an alkali-metal salt; and a cathode; said alkali-metal cations from said electrolyte being inserted into said anode as a metal alloy or as an inserted ion in said alkali metal cation inserting material during the charging of said battery, said improvement comprises an anode in which said conjugated backbone polymers contained in said anode have been predoped with one or m ore alkali metal cations to the reduced state prior to incorporation of said anode into said battery.

2. The battery of claim 1 wherein said conjugated polymer is reduced (n-doped) during the charging of said battery.

3. The battery of claim 1 wherein said conjugated backbone polymer of said anode is polyacetylene, poly(p-phenylene) or poly(p-phenylene vinylene).

4. The battery of claim 3 wherein said polymer is polyacetylene or poly(p-phenylene).

5. The battery of claim 1 wherein said alkalimetal salt of said electrolyte is a lithium salt, sodium salt or mixture thereof.

6. The battery of claim 1 wherein said material is a metal.

7. The battery of claim 6 wherein said metal is aluminum, lead, tin, antimony, bismuth, magnesium, silicon or alloys thereof.

8. The battery of claim 1 wherein said metal is aluminum, lead, tin or tin-lead alloys.

9. The battery of claim 8 wherein said metal salt is a lithium salt and said metal is aluminum or lead.

10. The battery of claim 8 wherein said metal salt is a sodium salt and said metal is lead, tin or lead-tin alloys.

11. The battery of claim 1 wherein said material is an alkali-metal ion inserting material.

12. The battery of claim 11 wherein said material is a transition metal chalcogenide.

13. The battery of claim 12 wherein said transition metal chalcogenide is selected from the group consisting of $TiS_2$, $MoO_2$, $WO_2$, $FeCuS_2$, $VSe_2$ and $VS_2$.

14. The battery of claim 12 wherein said chalcogenide is $TiS_2$ or $WO_2$.

15. The battery of claim 1 wherein said anode comprises:
   from about 5 to about 75 percent by weight of said polymer; and
   from about 25 to about 95 percent by weight of said other electroactive mateial, wherein said weight percent is based on the total weight of polymer and material.

16. The battery of claim 15 wherein said anode comprises:
   from about 20 to about 50 percent by weight of said polymer; and
   from about 50 to about 80 percent by weight of said other electroactive material.

17. The battery of claim 1 wherein said polymer is polyacetylene or poly(p-phenylene), said alkali metal cation is lithium and said other electroactive material is aluminum or lead.

18. The battery of claim 1 wherein said polymer is poly(p-phenylene), said cations are lithium cations and said alkali metal inserting material is $WO_2$.

19. The battery of claim 1 wherein said polymer is polyacetylene or poly(p-phenylene), said alkali metal cations are sodium, and said other electroactive material is lead, tin or a lead-tin alloy.

* * * * *